Dec. 21, 1926.
F. H. ARNZEN
1,611,503
AUTOMATIC REEL ADJUSTING MECHANISM FOR HARVESTER THRASHERS AND HEADERS
Filed June 30, 1925    2 Sheets-Sheet 1
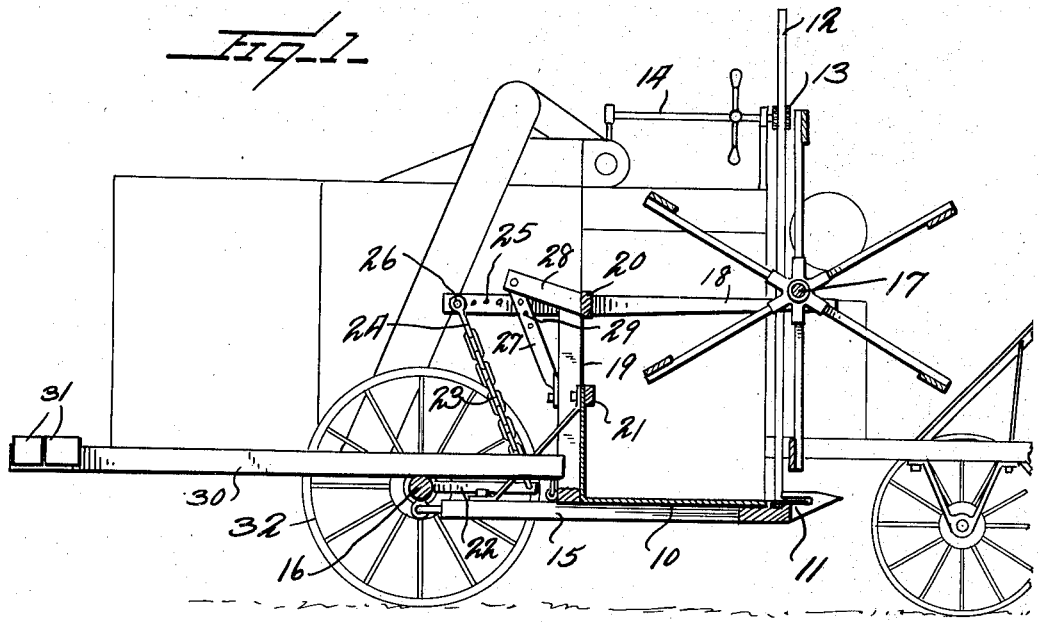
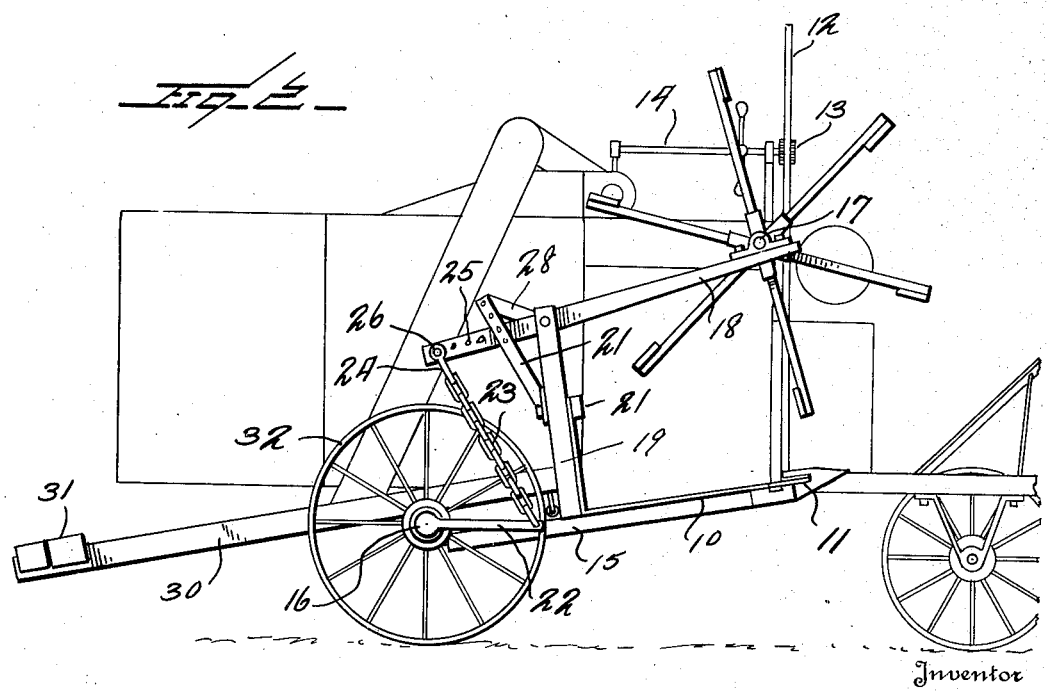
Inventor
F. H. Arnzen
By Watson E. Coleman
Attorney Dec. 21, 1926. 1,611,503
F. H. ARNZEN
AUTOMATIC REEL ADJUSTING MECHANISM FOR HARVESTER THRASHERS AND HEADERS
Filed June 30, 1925 2 Sheets-Sheet 2
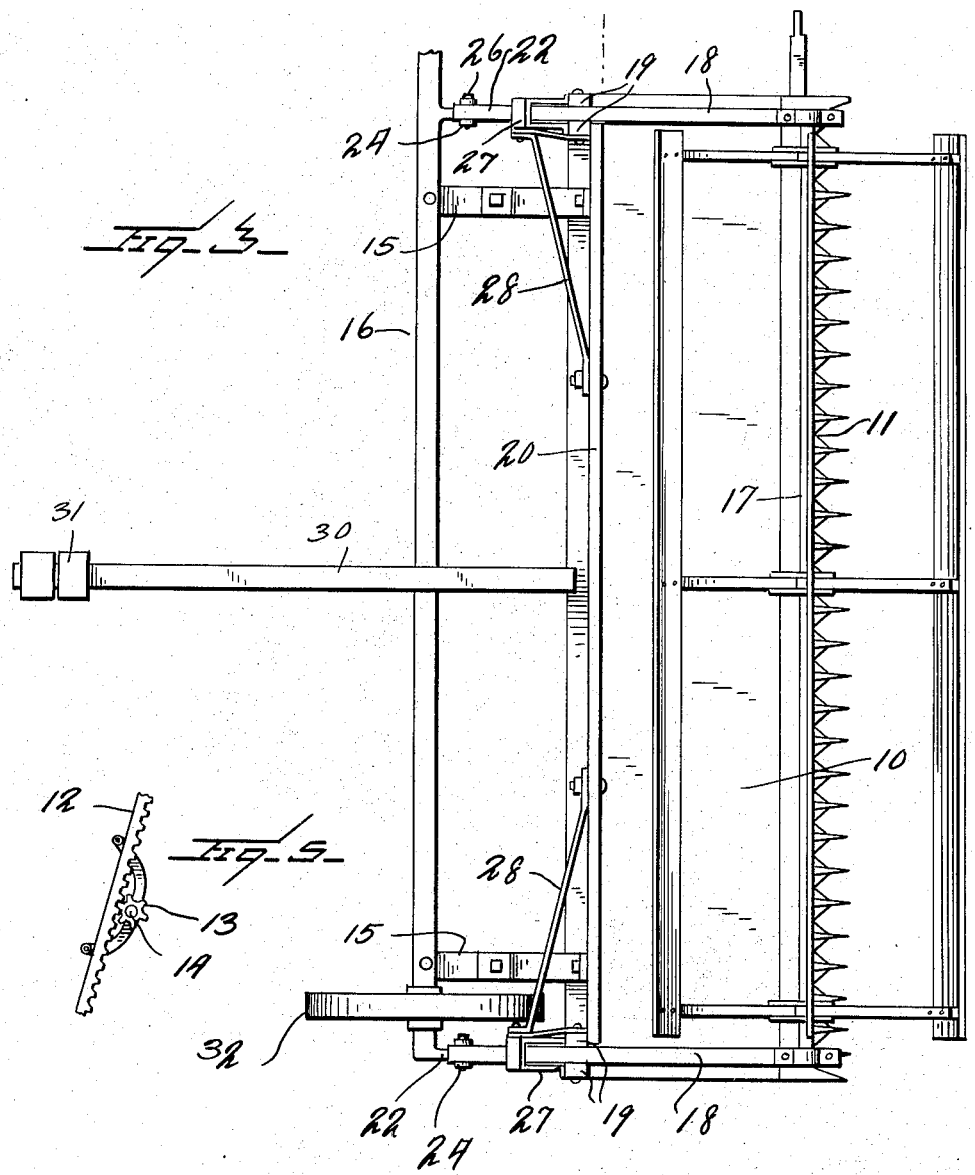
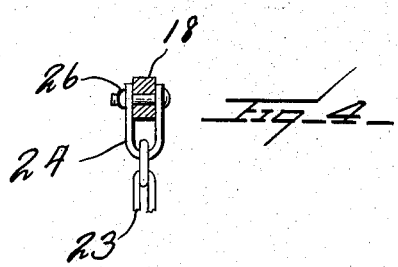
Inventor
F. H. Arnzen
By Watson E. Coleman
Attorney Patented Dec. 21, 1926.

1,611,503

UNITED STATES PATENT OFFICE.

FRANK H. ARNZEN, OF GREENCREEK, IDAHO.

AUTOMATIC REEL-ADJUSTING MECHANISM FOR HARVESTER THRASHERS AND HEADERS.

Application filed June 30, 1925. Serial No. 40,595.

This invention relates to harvester thrashers, and particularly to the reel and platform thereof.

In operating harvester thrashers, when the grain is short the reel will run relatively close to the platform to thereby throw the grain on the draper and when, on the other hand, the grain is long the reel should be raised relative to the platform so that the reel will not throw the grain over the back of the platform.

All harvester thrashers are today provided with means for adjusting the reel relative to the platform so that the reel will be closer to the platform under some circumstances and in cutting short grain and relatively high above the platform when long grain is being cut, but this adjustment is not automatic and as a consequence in operating a field where the grain is sometimes short and sometimes long the thrasher will either miss the short grain or tangle the long grain, and furthermore if the grain is down in some spots and standing in other spots the thrasher as now constructed will not cut satisfactorily the grain that is down and much grain is lost in this way.

The object of the present invention is to provide means whereby as the platform is raised or lowered by the operator on the harvesting machine the reel shall be automatically raised or lowered relative to the platform and particularly so that when the platform is raised for high grain the reel will be automatically raised relative to the platform and when the platform is lowered by the operator the reel will lower more swiftly than the platform will be lowered so that the reel will not move downwardly merely with the platform but move at a greater speed than the platform.

A further object is to provide means whereby the ratio between the downward or upward movement of the platform and the downward or upward movement of the reel may be controllably varied.

A still further object is to provide means whereby the downward movement of the reel may be limited, that is, so that the reel cannot move downward toward the platform beyond a certain point and will be normally held at this point.

Other objects have to do with the details of construction and arrangement of parts as will appear more fully hereinafter.

My invention is illustrated in the accompanying drawings, wherein:—

Figure 1 is a longitudinal vertical sectional view through the platform of a harvester thrasher showing my reel supporting mechanism thereon;

Figure 2 is a side elevation of the structure shown in Figure 1;

Figure 3 is a top plan view of the platform and platform raising mechanism shown in Figure 1;

Figure 4 is a fragmentary section through one of the levers showing the connection of the clevis thereto;

Figure 5 is a fragmentary elevation showing the conventional means for raising and lowering the platform.

Referring to these drawings, 10 designates the platform of the harvester thrasher, which platform carries the usual sickle bar 11 at its forward end. The means whereby this sickle bar is operated and mounted forms no part of my invention. This platform is on all harvester thrashers known to me and lifted by mechanism controlled by the operator on the harvester thrasher itself, and I have simply illustrated for this purpose a rod 12 which is in the form of a rack and is engaged by a pinion 13 on the shaft 14, it being understood that this mechanism is simply illustrated to show a lifting means and that any lifting means may be used. The rear end of the platform 10 in all harvester thrashers known to me is mounted on arms 15, which in turn are swingingly or tiltably engaged with an axle 16 so that when the rod 12 is raised the forward end of the platform is raised and when the rod is lowered the forward end of the platform is lowered.

In my improved mechanism the reel shaft 17 is carried upon two outwardly projecting levers 18, these levers being each pivoted between two upright posts 19 which are mounted at the rear of the platform. Engaged with the inner posts 19 is the transverse beam 20 and these inner posts support the transverse beam 21 adjacent the platform and support the back of the platform which is formed of netting or other suitable material, as usual. Extending forward from the axle 16 are arms 22 and extending upward from these arms are chains or other flexible connections 23 which at their upper ends are engaged with clevises 24, there being a clevis to each of the levers 18. These clevises embrace the levers 18 and each lever is formed with a series of holes 25 and a pin 26 passes through the perforations in the arms of the clevis and through the proper perforation 25 in the rear end of the lever.

Bolted or otherwise attached to the post 19 are the U-shaped guides 27, each lever 18 passing through one of these U-shaped guides which acts to hold the lever from any lateral movement. These guides are braced by braces 28 which are attached to the cross beam 20 at their inner ends and at their outer ends attached to the guide by a bolt or other suitable connection. Each guide is formed with perforations 29 through which a pin may be passed to thereby limit the upward movement of this end of the lever and thereby limit the downward movement of the reel toward the platform.

Pivotally connected to the rear of the platform and extending rearward therefrom and resting either directly or indirectly upon the axle is a counterbalancing arm 30 upon which weights 31 may be placed for the purpose of counterbalancing the weight of the platform 10 and permitting the platform to be readily raised or lowered by means of the shaft 14 and pinion 13.

It will be understood that I have shown only so much of a harvester thrasher as is necessary for an understanding of my invention and that I have not attempted to show the thrashing mechanism, elevating mechanism or the main frame of the truck which supports this last named mechanism, nor have I attempted to show the mechanism for operating the sickle bar, and it is to be understood further that the axle 16 may carry one or more wheels 32 for supporting the reel platform and that the reel platform may be connected to the frame of the machine in any suitable manner which, for instance, will permit, as is common in this class of devices, the platform to be tilted laterally so as to operate on a side hill.

The operation of the device is as follows: When the platform 10 is lowered the arms 22 remain stationary and the posts 19 are lowered also, but as the posts 19 lower, the chain 23, which is taut at this time, will prevent the rear ends of the levers 18 which support the reel from raising and as a consequence as the platform lowers the forward ends of the levers 18 will be lowered more rapidly than the platform, thus shifting the reel downward more rapidly than the platform shifts downward. The reel thus will have a downward movement 50% greater than the downward movement of the platform with the parts adjusted as described so that the reel will be relatively nearer to the platform when the platform is lowered than when the platform is raised. When the platform is raised, the posts 19 will be raised lifting up the levers 18. The chains 23 under these circumstances will exert a strain upon the rear ends of the levers so that the higher the platform is raised the more the reel will be shifted away from the platform. Thus it will be seen that in either case the reel moves faster than the platform. By placing pins through the apertures 29, the upward movement of the rear ends of the levers 18 is limited and the reel may be held in any desired normal relation to the platform. By adjusting the clevis 24 nearer to or further from the fulcrum of the levers 18 a greater or less degree of relative movement may be secured, or in other words the ratio of movement of the forward ends of the levers 18 with reference to the platform may be increased or decreased.

It will thus be seen that by this mechanism I secure an automatic raising or lowering of the reel so that when the grain is short the reel may run close to the platform to throw the grain onto the draper and when the grain is long in another spot, for instance, of the same field the reel will be shifted up relatively to the platform so that it does not throw the grain over the back of the platform. The usual mechanism of the harvester thrasher provides means whereby the platform may be raised or lowered by the operator to suit different conditions of operation and my mechanism added thereto causes the automatic shifting of the reel relative to the platform so that short or long grain in the same field may be headed and even grain which has been blown down. With my automatic adjuster I can cut either the standing grain or grain which is down with the same efficiency so that all the grain is harvested and not merely part of it.

An important feature of my machine resides in the flexible connection 23 between the arm 22 and the reel supporting lever 18 inasmuch as this flexible connection permits the reel to rise in case a large amount of straw should gather over the sickle. If the reel cannot move upward under these circumstances, the reel cannot turn and if forced to turn it will break. With my construction, however, if this circumstance arises the reel can rise and thus obviate either a complete stoppage of the machine or any breakage. The means whereby I stop the downward movement of the reel at any point desired is also of particular advantage. With my mechanism the reel can be stopped at any distance from the sickle in the length of time it takes for a man to walk from one side to the other of the platform and this without stopping the machine, for the reason that a single operator could press downward at the rear end of the lever 18 and insert a pin through one of the holes in member 27 over the member 18 and this will act to stop the reel in its descent at any desired point and without in any manner affecting the raising or lowering of the platform by reason of the use of the flexible connection 23.

While I have illustrated certain details of construction and arrangement of parts which I have found to be particularly effective for this purpose, I do not wish to be limited thereto as it is obvious that many changes might be made in these details without departing from the spirit of this invention as defined in the appended claims.

I claim:—

1. In a header, a vertically movable platform, a reel supported above the platform, and means for vertically moving the platform in combination with means acting to automatically lift the reel as the platform is raised and at a greater speed than the speed of the platform or to lower the reel as the platform is lowered at a greater speed than the platform, and means for adjustably varying the ratio between the speed of the platform and the speed of the reel.

2. In a header, a vertically movable platform, a reel mounted above the platform, and means for vertically moving the platform in combination with means for causing the reel to move upward and away from the platform as the platform is raised and to move toward the platform as the platform is lowered, and means for limiting the distance which the reel can lower toward the platform.

3. In a header, the combination with a platform, a rear axle upon which the platform is mounted for tilting movement in a vertical plane and means for vertically moving the platform, of posts extending upward from the rear end of the platform, levers mounted upon said posts and extending over the platform, a reel supported by the forward ends of the levers, and flexible means engaging the rear ends of the levers and preventing upward movement of the rear ends of the levers when the platform is raised or lowered.

4. In a header, the combination with a platform, a rear axle upon which the platform is mounted for tilting movement in a vertical plane and means for raising and lowering the platform, of posts extending upward from the rear end of the platform, levers mounted upon said posts and extending over the platform, a reel supported by the forward ends of the levers, and means engaging the rear ends of the levers and preventing upward movement of the rear ends of the levers when the platform is raised or lowered, said means being adjustably engageable with the levers at a plurality of points between the rear ends of the levers and the fulcrums of the levers.

5. In a header, the combination with a platform, a rear axle upon which the platform is pivoted for tilting movement in a vertical plane and means for raising or lowering the platform, of posts extending upward from the rear end of the platform and disclosed in right angular relation thereto, levers pivoted upon the upper ends of the posts and extending forward over the platform, a reel mounted upon said levers, means operatively connected to the axle and operatively engaging the rear ends of the levers and limiting the upward movement of the rear ends of the levers when the platform and the posts are raised or lowered to thereby shift the reel with relation to the platform, but permitting the free downward movement of the rear ends of the lever, and means attached to the posts and engageable with the rear ends of the levers and adjustably limiting the upward movement of the rear ends of the levers but permitting the free downward movement of the levers.

6. In a header, the combination with a platform, a rear axle upon which the platform is pivoted for tilting movement in a vertical plane and means for raising or lowering the platform, of posts extending upward from the rear end of the platform, levers pivoted upon the upper ends of the posts and extending forward over the platform, a reel mounted upon said levers, flexible means operatively connected to the axle preventing upward movement of the rear ends of the levers when the platform and the posts are raised or lowered to thereby shift the reel with relation to the platform, means attached to the posts and engageable with the rear ends of the levers to limit the upward movement of the rear ends of the levers, said means comprising a member attached to said posts and extending parallel to the path of movement of the corresponding lever, said member being provided with a plurality of apertures, and a stop adjustable in any one of said apertures.

7. In a header, the combination with a platform, a rear axle upon which the platform is mounted for tilting movement in a vertical plane and means for raising or lowering the platform, of a counterbalancing arm connected to the platform and extending rearward thereof and operatively supported upon the axle, posts extending upward from the rear end of the platform, levers pivotally mounted upon the posts, the portion of each lever rearward of the fulcrum thus formed being shorter than the portion forward thereof, a reel supported upon the forward ends of the levers, flexible connections fixed with relation to the platform and operatively connected to the axle and to the rear ends of the levers and adjustable toward or from the fulcrum, and means for adjustably limiting the downward movement of the forward ends of the levers.

In testimony whereof I hereunto affix my signature

FRANK H ARNZEN.